(12) United States Patent
Wyser

(10) Patent No.: US 6,232,015 B1
(45) Date of Patent: May 15, 2001

(54) PRISMATIC STORAGE BATTERY OR CELL WITH RIGID COMPRESSIVE CONTAINER

(75) Inventor: Paul Julian Wyser, Appenzell (CH)

(73) Assignee: Renata AG, Itingen (CH)

( * ) Notice: Subject to any disclaimer, the term of this patent is extended or adjusted under 35 U.S.C. 154(b) by 0 days.

(21) Appl. No.: 09/275,885

(22) Filed: Mar. 25, 1999

(30) Foreign Application Priority Data

Mar. 30, 1998 (EP) .................................................. 98105759

(51) Int. Cl.$^7$ ............................ H01M 2/02; H01M 10/04
(52) U.S. Cl. .......................... 429/176; 429/175; 429/94
(58) Field of Search ........................... 429/176, 94, 175; H01M 2/02

(56) References Cited

U.S. PATENT DOCUMENTS

| | | | |
|---|---|---|---|
| 5,434,017 | 7/1995 | Berkowitz et al. | 429/94 |
| 5,439,760 | 8/1995 | Howard et al. | 429/94 |
| 5,486,215 | 1/1996 | Kelm et al. | 29/623.1 |
| 5,556,722 | 9/1996 | Narukawa et al. | |
| 6,033,800 | * 3/2000 | Ichiyanagi et al. | |

FOREIGN PATENT DOCUMENTS

| | | |
|---|---|---|
| 0 655 793 | 5/1995 | (EP) . |
| 63-245851 | 10/1988 | (JP) . |
| 6-342649 | 12/1994 | (JP) . |
| 9-237613 | 9/1997 | (JP) . |

* cited by examiner

*Primary Examiner*—John S. Maples
(74) *Attorney, Agent, or Firm*—Connolly Bove Lodge & Hutz

(57) ABSTRACT

Prismatic battery for a non circular spiral winding, having a metal container (1) of equal thickness formed by a rectangular base (15) and, perpendicular to the latter, by two small walls (12, 14) attached to said base (15), two large walls (11, 13) attached on the one hand to the small walls (12, 14) via narrow strips (21 to 24) of width $1_1$, on the other hand to the base (15) via narrow strips (25, 25a) of width $1_2$, said strips (21 to 24, 25 to 25a) being inclined towards the external faces of the large walls (11, 13) and having between them junction lines (26) from the four angles of the base (15).

6 Claims, 3 Drawing Sheets

PRISMATIC STORAGE BATTERY OR CELL WITH RIGID COMPRESSIVE CONTAINER

The present invention concerns a storage battery or prismatic cell, designated hereinafter by the generic term "battery", whether the power source is rechargeable or not. The invention concerns more particularly such a battery in which the power source is formed of a winding of active materials of the jelly roll type.

BACKGROUND OF THE INVENTION

In portable equipment, such as mobile telephones, prismatic shaped batteries are generally preferred to rod shaped ones in particular to reduce the overall size of the equipment. This portable equipment, which must by definition be light, generally incorporate electronic circuits and components which are fragile and often demanding from the point of view of power consumption. It is thus desirable for the prismatic batteries used in such equipment to have high power density while being light and of the lowest manufacturing cost possible, for them to have sufficient longevity, in particular in the case of storage batteries, and for them to have during use all necessary guarantees from the safety point of view, as regards both the user and the contiguous electronic circuits.

An object of the present invention is to provide a prismatic battery which, for a determined current density, is lighter, has a lower manufacturing cost than the prismatic batteries of the prior art and whose design also allows safety of use to be increased.

The prismatic batteries of the prior art, schematically shown in FIG. 1 are formed by a metal container 1 of parallelepiped shape, within which is placed a non circular spiral winding 2, of the jelly roll type (visible in FIGS. 1A, 1B), which is impregnated by an electrolyte after the winding is put in place. This winding is obtained from at least one composite strip including a layer of active material forming anode 2a, a porous separator 2b, a layer of active material forming cathode 2c and a second porous separator 2b. The anode and the cathode each include connection means 5, 6, generally arranged close to the inner wall of container 1 and at the center of winding 2. This jelly roll is generally held compressed by means of two corrugated elastic plates 3a, 3b, arranged between the large walls 11, 13 of container 1 and winding 2. These elastic plates also allow the small variations in volume of winding 2 to be absorbed during the charging/discharging cycles. The unit thereby formed is hermetically sealed by a cover 4 carrying contact terminals 7, 8 electrically connected to electrodes 2a, 2c by connection means 5, 6 said electric connections being effected by welding. This type of prismatic battery, in particular in the case of an storage battery, generally also includes a safety vent schematically shown at 9. This safety vent 9 is in fact necessary given the chemical reactions which take place and which can cause an increase in pressure and/or temperature. Because of the mechanical stress which are exerted on the case of the battery, the container was first chosen to be formed of steel sheet of equal thickness of the order f 0.5 mm (FIG. A). In order to make this battery lighter and less expensive, it was then proposed to replace the steel with aluminum or an aluminum alloy. In order to have the same resistance to deformation, it is then necessary to increase the thickness of the container wall, which has the drawback, either of increasing the size of the battery for a given power density, or reducing the quantity of active material and thus the power density if one wishes to keep the size of the battery within standard dimensions.

In order to avoid this drawback, U.S. Pat. No. 5,556,722 proposes reinforcing the angles 1a to 1d of the container, i.e. having a excess thickness locally, as shown in FIG. 1 B. Although the manufacturing method for such a container is not described, it is obvious that such a configuration increases the cost of the final product given that one can no longer use a metal sheet of equal thickness as the starting material.

SUMMARY OF THE INVENTION

The object of the present invention is to overcome the aforementioned drawbacks by providing a prismatic jelly roll battery, having a low weight and manufacturing cost, while having available a power density at least equal to known prismatic batteries having the same external dimensions.

The invention therefore concerns a prismatic battery including a metal container of substantially identical thickness at any point, within which is arranged a non circular spiral winding formed by a composite strip including an anode, separators and a cathode impregnated by an electrolyte, the container being sealed at its upper portion by a sealed cover carrying two contacts terminals electrically connected to the anode and the cathode via connection means, characterized in that said container is formed by a rectangular base and, perpendicular to the latter, by two small walls attached to the base, two large walls attached on the one hand to the small walls via narrow strips of width $I_1$, on the other hand to the base via narrow strips of width $I_2$, the strips being inclined towards the external faces of the large walls and having between them junction lines from the four angles of the base.

The strips joining the large walls to the small walls form with respect to the plane of the large walls an angle $\alpha_1$ and the strips joining the large walls to the base an angle $\alpha_2$. So that the junction lines between the strips are perfect at the angles, the variables $\alpha_1$, $\alpha_2$, $I_1$ and $I_2$ must satisfy by the relationship $I_1 \sin \alpha_1 = I2 \sin \alpha_2$.

It is thus possible, by using the free space left in the angles by the spiral winding in a rational manner, and without thereby providing a particular profile for the tubular portion of the container, to give the large walls sufficient rigidity to resist the internal pressures of the prismatic battery. Indeed, a peripheral rib, which shortens the bending distance near the edges is thus formed. If aluminum or an aluminum alloy is used to manufacture the container, the thickness of the walls could be substantially the same as that of steel containers, i.e. of the order of 0.5 mm for batteries of the current type, and an advantage would thus be obtained as regards weight and cost.

If steel is still used, or a steel alloy, it would then be possible to reduce the thickness of the container walls for example from 0.5 mm to 0.35 mm while keeping the same mechanical properties, while still having an advantage as regards weight and cost.

According to another aspect of the invention the reduction in cost also results from the fact that it is no longer necessary to insert an elastic spacer between the large walls and the spiral winding to obtain good cohesion of the spiral winding, such cohesion being necessary to obtain the optimum yield from the active materials, and thus the best possible power density.

This result is obtained as a result of a method for manufacturing the container consisting in deforming a metal sheet by stamping so as to obtain a convex container having at its base junction strips corresponding to the values $\alpha_1$, $\alpha_2$, $1_1$, and $1_2$, then introducing the spiral winding and finally stamping the large walls to give them a concave shape.

It will be noted that the method according to the invention offers the advantage of having, prior to stamping the large walls, a cavity having a volume greater than the final volume, which allows the jelly roll to be put in place already impregnated by the electrolyte, despite the swelling that this has caused.

BRIEF DESCRIPTION OF THE DRAWINGS

Other features and advantages of the present invention will appear more clearly in the following description with reference to the annexed drawings, in which.

DETAILED DESCRIPTION OF THE INVENTION

Figure 1:
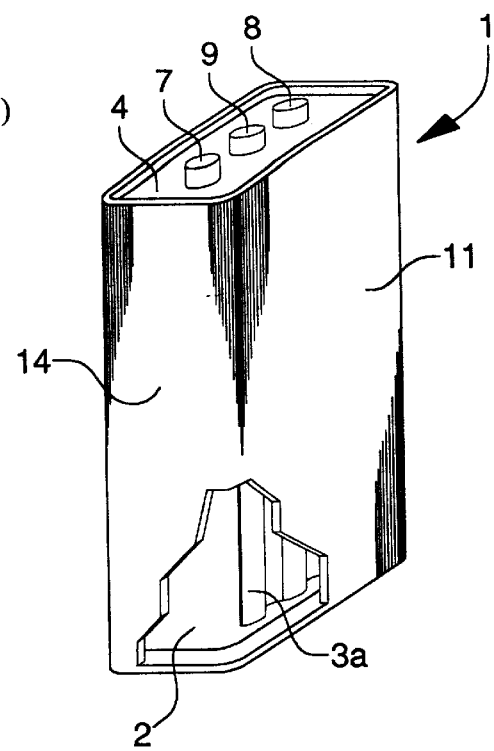
FIGS. 1, 1A and 1B show prismatic batteries of the prior art.
Figure 1A:
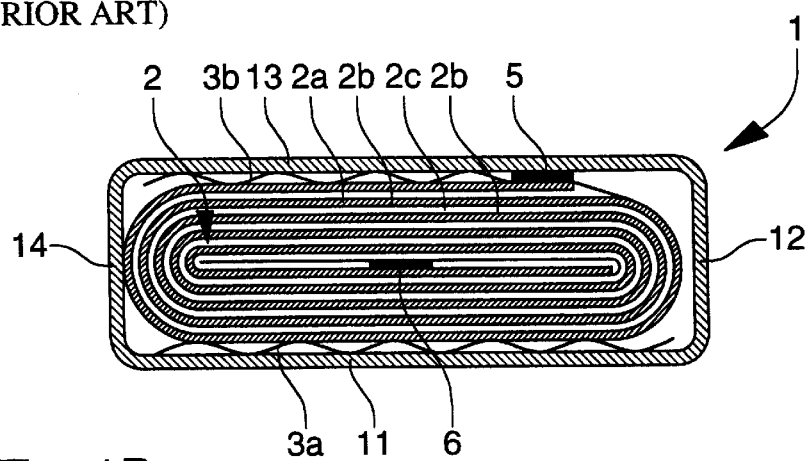
Figure 1B:
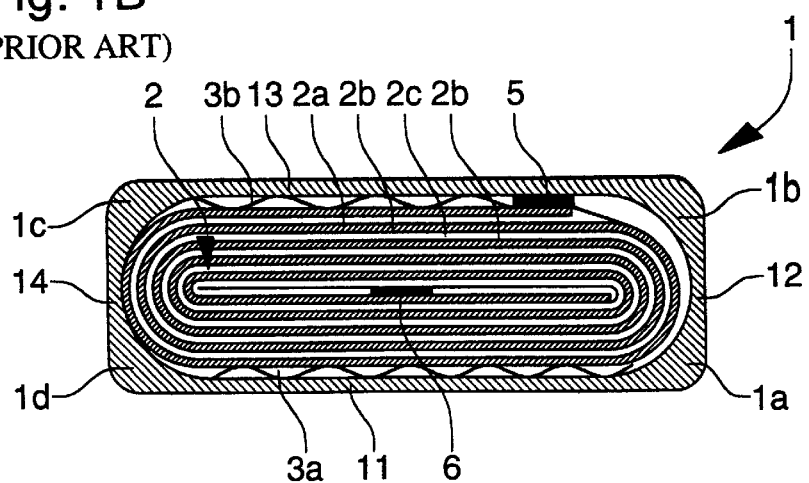

Since FIGS. 1, 1A and 1B have already been described in the preamble as representative of the state of the art, FIGS. 2 to 6 which show a prismatic battery according to the invention, will now be considered, these Figures also allowing the main steps of the manufacturing method to be understood.

Figure 2:
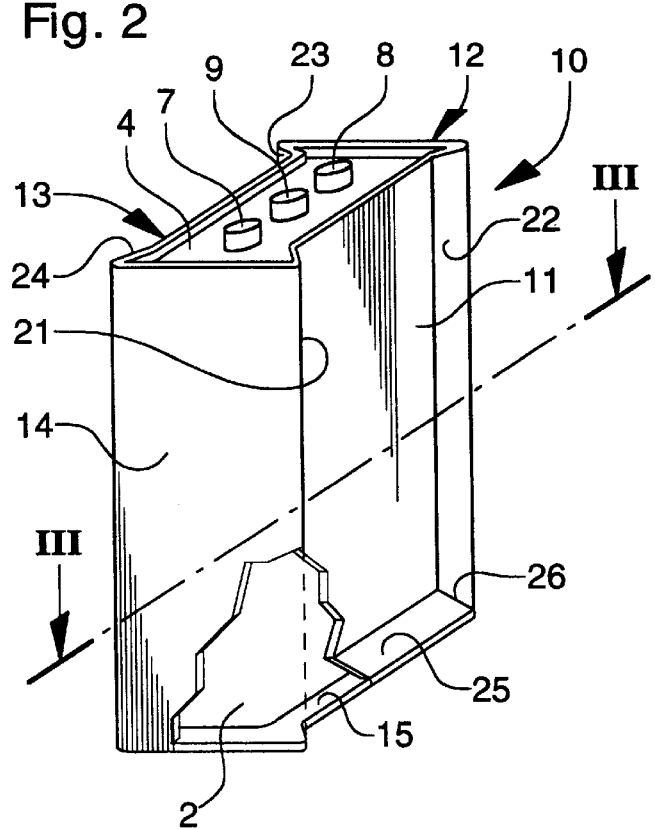
FIG. 2 shows in partially torn away perspective a prismatic battery according to the invention.

The prismatic battery shown in FIG. 2 includes a metal container 1 formed of a tubular member closed at its lower part by a bottom 15 of generally rectangular shape. The tubular member includes two large plane walls 11, 13, two small plane walls 12, 14 and narrow rectangular vertical 21, 22, 23, 24 and horizontal 25 and 25a strips (not visible in FIG. 2) assuring the junctions of the walls with each other and the walls with the bottom. All the above elements forming the container have substantially the same thickness. In particular, there is no excess thickness created in the vertical angles of the container. Strips 21 to 24 of width $I_1$, allow small walls 12, 14 to be joined to large walls 11, 13 and are inclined towards the interior of the container 1 at an angle $\alpha_1$. Strips 25 and 25a of width $I_2$ allow bottom 15 to be joined to large walls 11, 13 and are also inclined towards the interior of the container at an angle $\alpha_2$. On either side of the large faces of the battery two vertical strips 21 and 22, and respectively 23 and 24, are connected to a horizontal strip 25, and respectively 25a, along junction lines 26, said junction lines being perfect if the parameters $\alpha_1$, $\alpha_2$, $I_1$, and $I_2$ defining the orientation of the strips and their widths satisfy the relationship $I_1 \sin \alpha_1 = I_2 \sin \alpha_2$. The container contains a winding of active material 2 of the jelly roll type impregnated by an electrolyte while being closed at its upper part by a cover 4 provided with contact terminals 7, 8 and a safety vent 9. The contact terminals are electrically connected to the electrodes of winding 2 by connection means 5, 6. Cover 4 has the same shape as the internal section of the container, i.e. a generally rectangular shape having triangular beaks in the angles, and its is welded to the container. The prismatic battery thus obtained is thus characterized by the concave appearance of its large external faces. If one wishes the prismatic battery thus obtained can be covered with a heat shrinking plastic sheath having the appropriate shape and able to be used for markings, such as the characteristics of the battery or the manufacturer's name.

Figure 5:
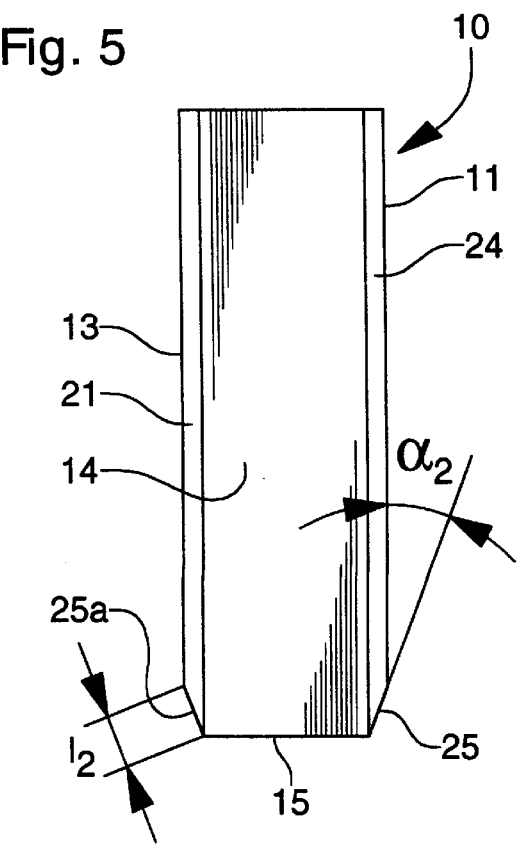
FIG. 5 is a side view of a small wall of the container of FIG. 2 prior to stamping of the large walls.
Figure 4:
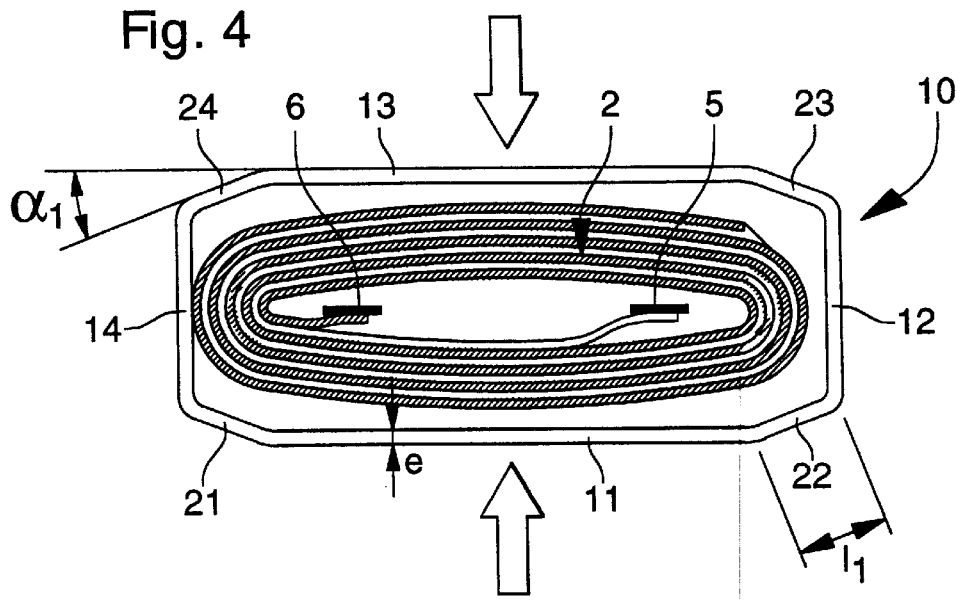
FIG. 4 is a top view of the container of FIG. 2, prior to stamping of the large walls.

The container which has just been described is obtained simply and economically as explained hereinafter with reference to drawings 4 to 6. In order to obtain the container shown in FIG. 2, one starts with a metal sheet having the appropriate dimensions. This sheet can for example be formed of an aluminum alloy with magnesium and silicon, such as Alpax® or Duralumin®, and it has sufficient thickness to obtain a final product having a uniform thickness of the order of 0.45 mm. The sheet undergoes a die-stamping operation along the opening axis to obtain a convex container 10, shown in FIGS. 4 and 5, the operation possibly being followed by a heat treatment to give the container the desired mechanical properties. This operation allows the junction angles between large walls 11, 13 and small walls 12, 14 to be shaped so as to have narrow strips 21 to 24, of width $I_1$, and forming an acute angle $\alpha_1$ with the plane of large walls 11, 13 (FIG. 4). Likewise, this operation allows the junction angles of large walls 11, 13 with bottom 15 to be shaped so as to have narrow strips 25, 25a of width $I_2$ and forming an acute angle $\alpha_2$ with the plane of large walls 11, 13 (FIG. 5). As indicated previously, so as to have a perfect junction line 26 between strips 25, 25a and strips 21 to 24 (visible in FIG. 2), the values $I_1$, $I_2$, $\alpha_1$ and $\alpha_2$ must satisfy the relationship $I_1 \sin \alpha_1 = I_2 \sin \alpha_2$. In practice, neighboring values will be selected for angles $\alpha_1$ and $\alpha_2$, and thus also for strip widths $I_1$, $I_2$.

Figure 3:
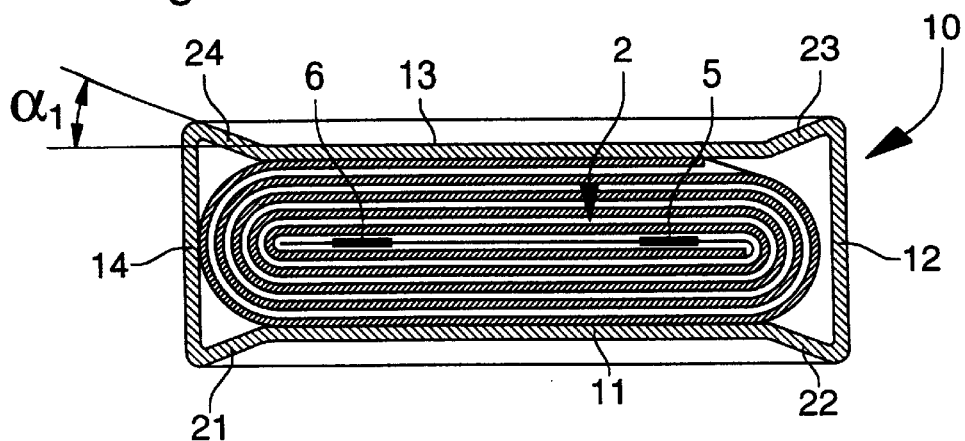
FIG. 3 is a cross-section along the line III—III of FIG. 2.

By way of example, for a prismatic battery having substantially as external dimensions 48×34×10 mm and a thickness of 0.45 mm, strips 21 to 14 can be given a width $I_1$=2.7 mm with an angle $\alpha_1$=15° and strips 25, 25a the width $I_2$=3.6 mm with an angle $\alpha_2$=11.2°. The angular recessed portions formed by the strips inside the container can be useful for the construction of the battery as will be explained hereinafter. Once convex container 10 has been obtained, jelly roll 2 is introduced into the cavity thereof, without inserting compression plates in the free space left between the internal faces of large walls 11, 13 and said winding 2, as is seen in FIG. 4. As indicated previously, this winding can advantageously be introduced having already been impregnated with the electrolyte. Large walls 11, 13 are then stamped by means of a die in the shape of a truncated pyramid whose head has a rectangular surface area equal to that of one large wall and whose angles correspond to values $\alpha_1$ and $\alpha_2$. The configuration shown in FIG. 3 is thus obtained, in which winding 2 is kept compressed by the large walls, with a pressure which is a function of the value given to angle $\alpha_1$. The manufacture of the battery is finished in accordance with known techniques, by adjusting if necessary the quantity of electrolyte, by performing charging/discharging cycles in the case of an storage battery, then by forming with connection means 5, 6 the electric junction between the anode and the cathode and the two contact terminals 7, 8, then hermetically sealing cover 4.

Figure 6:
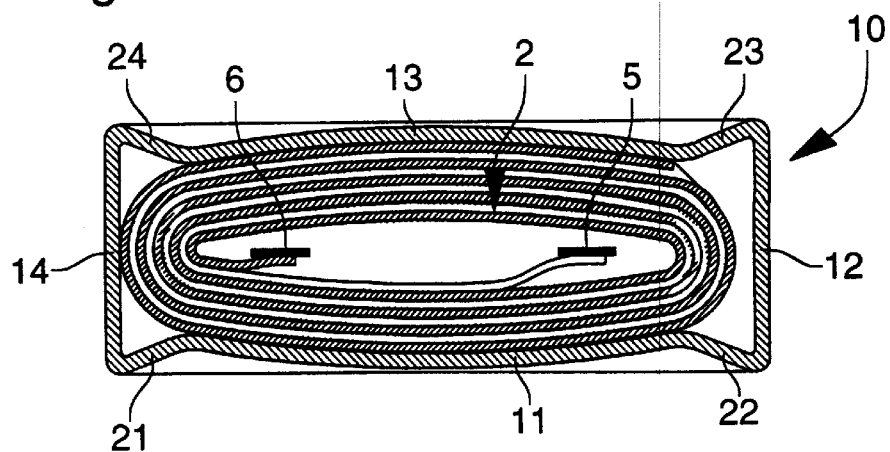
FIG. 6 shows in cross-section the possible deformation of the container shown in FIG. 3.

With reference to FIG. 6, it will also be noted that large walls 11, 13, like the elastic plates of the batteries of the prior art, allow the variations in volume of the spiral winding during charging/discharging cycles to be absorbed.

By selecting a metal other than aluminum, having higher mechanical characteristics, such as a stainless steel, copper or brass, it is possible to reduce the thickness of the container, for example to 0.35 mm thereby having an advantage as regards weight and cost.

The embodiments described hereinbefore, both as regards the choice of materials and the dimensions of the container for the battery, are capable of being adapted by those skilled in the art to the specific destination of a battery, without departing from the scope of the present invention.

What is claimed is:

1. A prismatic battery including a metal container of substantially identical thickness at any point, within which is arranged a non circular spiral winding formed by a composite strip including an anode, separators and a cathode, impregnated by an electrolyte, said container being sealed at its upper portion by a sealed cover carrying two contact terminals electrically connected to the anode and the cathode via connection means, wherein said container is formed by a rectangular base with four angles and, perpendicular to the latter, by two small walls attached to said base, and by two large walls attached to the small walls via narrow strips of width $I_1$ and to the base via narrow strips of width $I_2$, said strips being inclined towards the large walls and forming junction lines from the four angles of the rectangular base, and wherein depressed portions of said container are formed by the large walls and the narrow strips.

2. A prismatic battery according to claim 1, wherein the strips attaching the large walls and the small walls form with the plane of the large walls angle $\alpha_1$ and the strips attaching the large walls to the base form an angle $\alpha_2$, and wherein the values $\alpha_1$, $\alpha_2$, $I_1$ and $I_2$ satisfy the relationship $I_1 \sin \alpha_1 = I_2 \sin \alpha_2$.

3. A prismatic battery according to claim 1, wherein the metal forming the container is selected from among aluminum and an aluminum alloy.

4. A prismatic battery according to claim 1, wherein the metal forming the container is selected from among stainless steel, copper and brass.

5. A prismatic battery according to claim 1, wherein the large walls are in contact with the winding to assure the compression thereof.

6. A prismatic battery according to claim 1, wherein the depressed portions formed by the large walls and the strips are sheathed in a plastic material.

* * * * *